United States Patent
Fournel et al.

(10) Patent No.: US 10,197,193 B2
(45) Date of Patent: Feb. 5, 2019

(54) FLUID TRANSFER DEVICE AND APPARATUS INCLUDING SUCH A DEVICE

(71) Applicant: L'Air Liquide, Societe Anonyme pour l'Etude et l'Exploitation des Procedes Georges Claude, Paris (FR)

(72) Inventors: Jean-Luc Fournel, Silly-sur-Nied (FR); Thierry Novet, Bernin (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 292 days.

(21) Appl. No.: 15/023,234

(22) PCT Filed: Jun. 27, 2014

(86) PCT No.: PCT/FR2014/051638
§ 371 (c)(1),
(2) Date: Mar. 18, 2016

(87) PCT Pub. No.: WO2015/040292
PCT Pub. Date: Mar. 26, 2015

(65) Prior Publication Data
US 2016/0238162 A1    Aug. 18, 2016

(30) Foreign Application Priority Data
Sep. 19, 2013    (FR) ...................................... 13 59021

(51) Int. Cl.
*F16L 51/03*    (2006.01)
*F16L 3/16*    (2006.01)
(Continued)

(52) U.S. Cl.
CPC ............... *F16L 3/16* (2013.01); *F16L 27/026* (2013.01); *F16L 27/0861* (2013.01);
(Continued)

(58) Field of Classification Search
CPC .......... F16L 27/111; F16L 39/04; F16L 39/06; F16L 51/02; F16L 51/027; F16L 51/028; F16L 51/03
(Continued)

(56) References Cited

U.S. PATENT DOCUMENTS 2,335,478 A * 11/1943 Bergman ................ F16L 51/03
285/119
2,406,234 A * 8/1946 Marancik et al. .... F16L 51/027
285/187

(Continued)

FOREIGN PATENT DOCUMENTS

DE    12 18 821    6/1966
DE    202013104351 U1 *  1/2015 .............. F16L 59/21
(Continued)

OTHER PUBLICATIONS

International Search Report and Written Opinion for PCT/FR2014/051638, dated Sep. 15, 2014.
(Continued)

*Primary Examiner* — David Bochna
(74) *Attorney, Agent, or Firm* — Christopher J. Cronin

(57) ABSTRACT

A device for transferring fluid between two separate structures includes a rigid pipe with a double shell extending along a longitudinal axis. The pipe includes an outer-shell housing (in the inner vacuum space thereof), at least one inner duct for fluid transfer, and at first and second ends thereof, includes respective first and second rigid connections of the outer shell to the first structure and second structures, respectively. The first and second ends of the outer shell are rigidly connected to the at least one inner duct. The pipe comprises a system to compensate for movements in the longitudinal direction.

16 Claims, 4 Drawing Sheets

(51) Int. Cl.
*F16L 59/14* (2006.01)
*F16L 59/21* (2006.01)
*F16L 27/02* (2006.01)
*F16L 51/02* (2006.01)
*F16L 27/08* (2006.01)
*B63B 27/24* (2006.01)
*B63B 27/25* (2006.01)

(52) U.S. Cl.
CPC ............ *F16L 51/027* (2013.01); *F16L 51/03* (2013.01); *F16L 51/035* (2013.01); *F16L 59/141* (2013.01); *F16L 59/21* (2013.01); *B63B 27/24* (2013.01); *B63B 27/25* (2013.01)

(58) Field of Classification Search
USPC .............................. 285/227, 226, 145.5, 904
See application file for complete search history.

(56) References Cited

U.S. PATENT DOCUMENTS

| | | | | |
|---|---|---|---|---|
| 2,437,385 | A * | 3/1948 | Halford | F23R 3/48 285/227 |
| 2,493,404 | A * | 1/1950 | Haynes | F16L 27/1004 285/227 |
| 2,561,540 | A | 7/1951 | Sherbrooke | |
| 2,661,963 | A * | 12/1953 | Brown | F16L 51/03 285/114 |
| 2,707,117 | A * | 4/1955 | Fentress | F16L 51/027 138/121 |
| 2,822,193 | A * | 2/1958 | Wiethuchter | F16L 51/03 285/114 |
| 2,889,993 | A * | 6/1959 | Willetts | A01G 25/09 285/265 |
| 3,066,960 | A * | 12/1962 | Adams | F16L 27/0857 285/226 |
| 4,097,072 | A * | 6/1978 | van Heijst | F16L 27/02 285/226 |
| 4,158,462 | A * | 6/1979 | Coral | F16L 27/0857 285/144.1 |
| 4,215,882 | A * | 8/1980 | Bosch | F16L 27/111 285/227 |
| 4,746,148 | A * | 5/1988 | Perkins | F16L 27/111 285/114 |
| 4,865,298 | A * | 9/1989 | Jordan | F16L 27/0857 285/226 |
| 5,248,170 | A * | 9/1993 | Francis | F16L 51/035 138/120 |
| 5,299,840 | A * | 4/1994 | Heye | F16L 51/03 285/114 |
| 5,564,753 | A * | 10/1996 | Juttelstad | F16L 39/005 285/120.1 |
| 2013/0015653 | A1* | 1/2013 | Cipra | F16L 27/111 285/114 |
| 2015/0084328 | A1* | 3/2015 | Kampfe | F01N 13/14 285/48 |
| 2016/0069491 | A1* | 3/2016 | Holbach | F16L 27/1085 285/223 |

FOREIGN PATENT DOCUMENTS

EP 2546561 A1 * 1/2013 ............... F02K 9/84
GB 1 202 557 8/1970

OTHER PUBLICATIONS

French Search Report and Written Opinion for FR 1 359 021, dated Dec. 20, 2013.
Sarkar, et al., "Design, Analysis and Test Concept for Prototype Cryoline of ITER," AIP Conference Proceedings, vol. 985, Jul. 20, 2007, p. 2, ligne 4-p. 5; figures 3, 4.
Serio, et al., "Challenges for Cryogenics at ITER," AIP Conference Proceedings, vol. 13, Jan. 1, 2010, pp. 25-27.
Song, et al, "Design of the ITER TF Magnet Feeder Systems," IEEE Transactions on Applied Superconductivity, IEEE Service Center, Los Alamitos, California, US, vol. 20, No. 3, Jun. 1, 2010, p. 2, alinea 2-p. 3, figures 4, 5.
Zhu, et al., "Conceptual Design and Analysis of cold Mass Support of the CS3U Feeder for the ITER," Plasma Science and Technology, Institute of Physics Publishing, Bristol, GB, vol. 15, No. 6, Jun. 25, 2013.
Kalinin, et al., "ITER Cryogenic System," Fusion Engineering and Design, Elsevier Science Publishers, Amsterdam, NL, vol. 81, No. 23-24, p. 4.

* cited by examiner

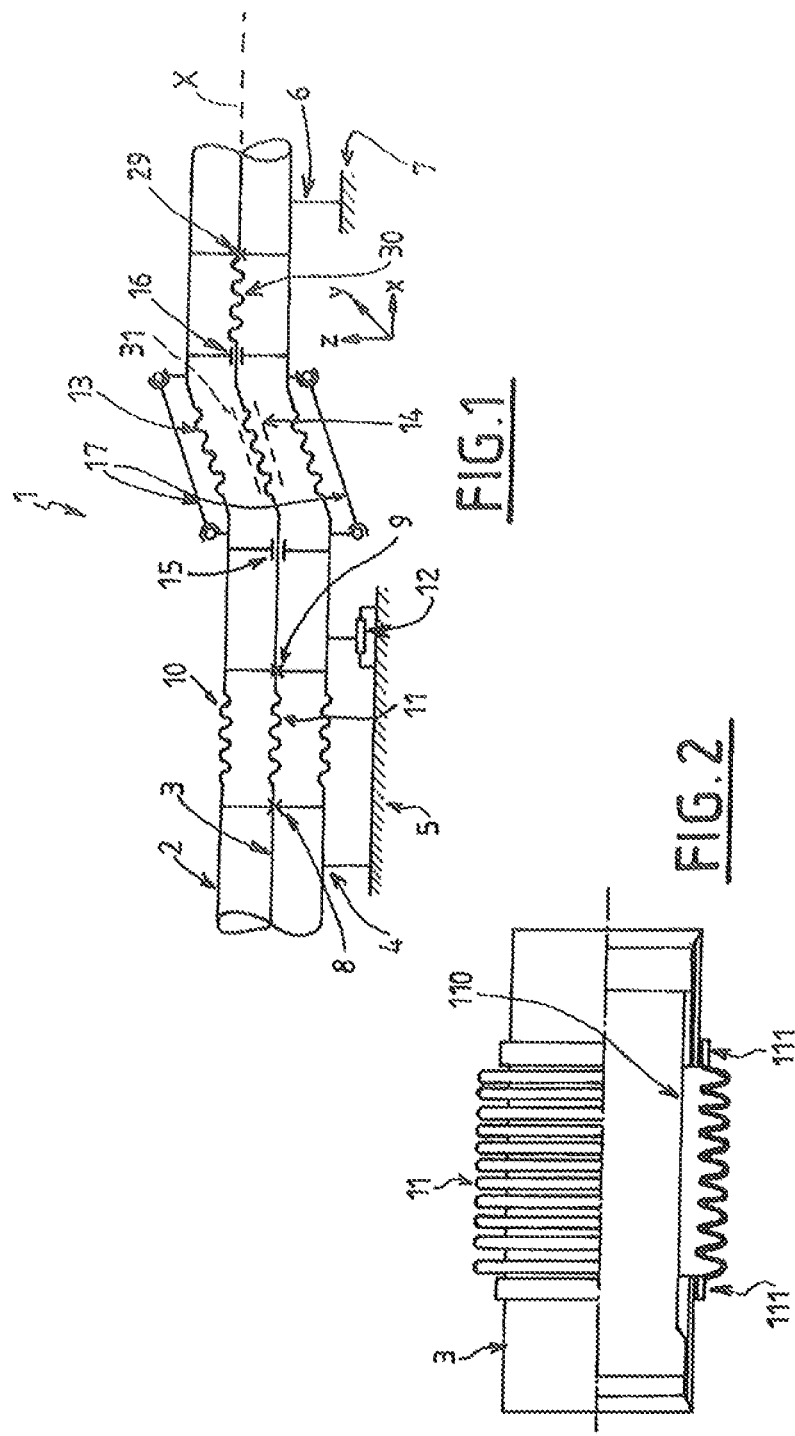

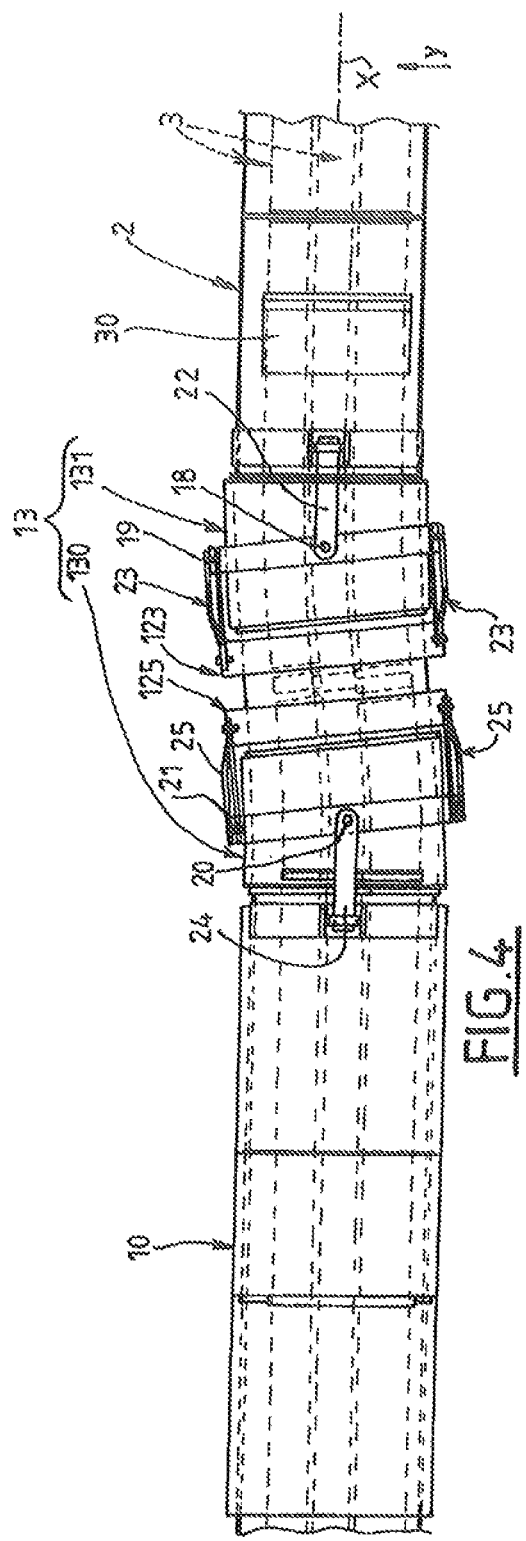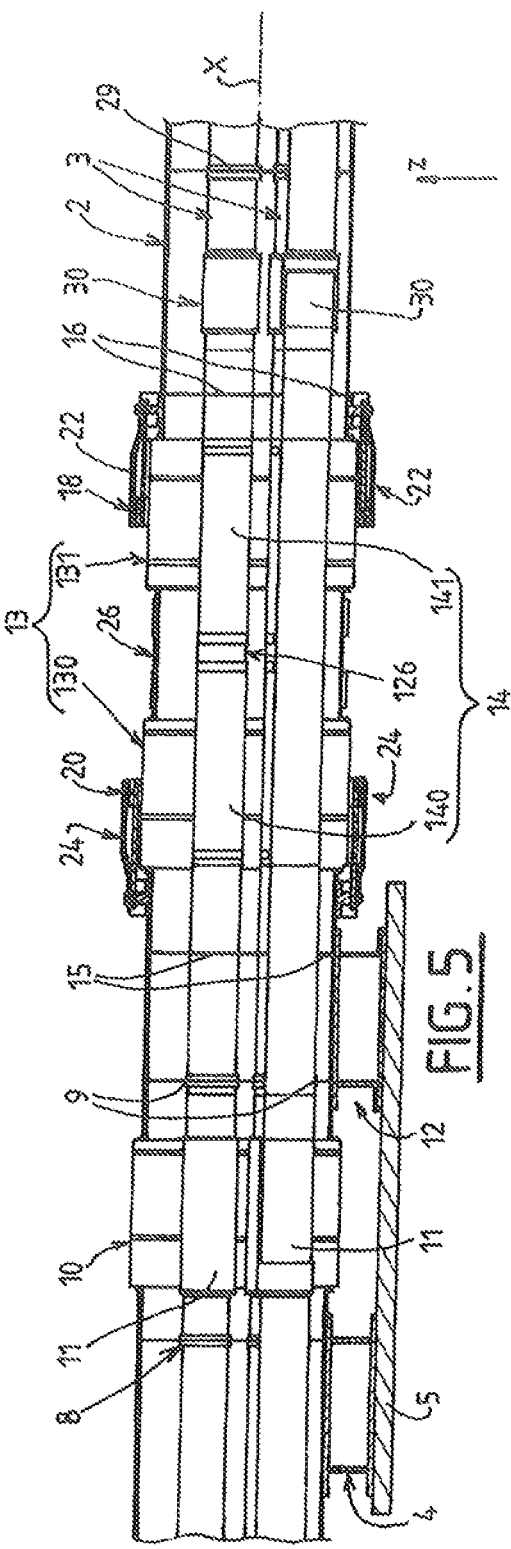

FLUID TRANSFER DEVICE AND APPARATUS INCLUDING SUCH A DEVICE

CROSS-REFERENCE TO RELATED APPLICATIONS

This application is a § 371 of International PCT Application PCT/FR2014/051638, filed Jun. 27, 2014, which claims § 119(a) foreign priority to French patent application FR1359021, filed Sep. 19, 2013.

BACKGROUND

Field of the Invention

The present invention relates to a fluid transfer device and an apparatus comprising such a device.

More particularly, the invention relates to a device for transfer of fluid between two ends which are designed to be connected respectively to two separate structures, such as two different buildings, the device comprising rigid double-envelope piping which extends according to a longitudinal axis, the piping comprising an outer envelope which accommodates in its inner volume which is designed to be put under vacuum at least one inner duct for transfer of fluid, the piping comprising at a first end a first rigid connection of the outer envelope to the first structure, and, at a second end, a second rigid connection of the outer envelope to the second structure, the first and second ends of the outer envelope being connected rigidly to the at least one inner duct, the piping comprising a system for compensation for relative displacements between its first and second ends.

Related Art

Rigid double-envelope piping under vacuum connected to independent structures (different buildings for example) must comprise a system for compensation for displacements in order to prevent rupture as a result of relative displacements generated by displacements of their end anchorage points or as a result of contractions caused by cold.

A known system uses a portion of piping bent in the shape of an S or a double S, known as a system "of the crank type according to the three axes XYZ" (typically four changes of direction at 90°).

This type of system makes it possible to accept reasonable stresses in the equipment, but gives rise to additional losses of load in the fluid circuits.

In addition, this type of system takes up a substantial volume in the corresponding installation (surface area on the ground in particular). Moreover, this type of architecture is relatively unstable vertically. In order to solve this problem of vertical stability, a vertical stop is provided which blocks the system vertically. Changes of direction of the fluid induce so-called "end load" effects in the pipes and/or at the supports (internal force which elongates the crank). This detracts from the stability of the pipes.

SUMMARY OF THE INVENTION

An objective of the present invention is to eliminate some or all of the aforementioned disadvantages of the prior art.

For this purpose, the device according to the invention, which moreover is in conformity with the generic definition given of it in the above preamble, is substantially characterized in that the system for compensation for displacements comprises at least one flexible area and at least one resilient area, said at least one resilient area being resilient according to the longitudinal direction, the system for compensation for displacements additionally comprising a connection which slides according to the longitudinal axis, between the outer envelope and the first structure, and a mechanism of universal joints, containing two universal joints and mechanically connecting the two ends of the flexible area.

In addition, embodiments of the invention can comprise one or a plurality of the following characteristics:
- the two universal joints each have two distinct axes of articulation perpendicular to the longitudinal axis;
- one of the two universal joints has two axes of articulations which are parallel respectively to the two axes of articulations of the other universal joint;
- when the device is in the fitted position, two first axes of parallel articulations of the universal joints are situated on a vertical plane, in order to permit limited horizontal deflection of the piping, whereas the two other, second axes of parallel articulations are situated on a horizontal plane, in order to permit limited horizontal deflection of the flexible area of the piping;
- in the longitudinal direction, the two first axes of articulations are situated between the two second axes of articulations;
- the resilient area comprises a first resilient portion of the outer envelope, and a first resilient portion of the at least one inner duct, said resilient portion of the at least one inner duct being situated between two rigid connections between the outer envelope and the at least one inner duct;
- the first resilient portion of the outer envelope and the first resilient portion of the at least one inner duct each comprise resilient bellows;
- the flexible area comprises a second flexible and resilient portion of the outer envelope, and a second flexible portion of the at least one inner duct, and the mechanism of universal joints connects the two ends of the outer envelope which are situated respectively on both sides of the second flexible and resilient portion of the outer envelope;
- the second flexible and resilient portion of the outer envelope comprises two bellows which are connected in series on both sides of a central rigid portion;
- the second flexible portion of the at least one inner duct comprises two flexible units connected in series on both sides of a central rigid portion;
- a first universal joint connects the central rigid portion of the outer envelope to a first side of the outer envelope which is oriented towards the first structure, whereas a second universal joint connects the central rigid portion of the outer envelope to a second side of the outer envelope which is oriented towards the second structure;
- each universal joint comprises a first pair of respective connection arms with a first end which is connected rigidly to the central rigid portion, and a second end which is articulated on a first respective connection ring arranged around a respective flexible unit, each universal joint comprising a second pair of respective connection arms with a first end which is articulated on the first respective connection ring, and a second end which is connected rigidly to a side concerned of the outer envelope;
- on both sides of the second flexible portion of the at least one inner duct, the at least one inner duct is connected to the outer envelope via respective connections which slide according to a direction parallel to the longitudinal axis of the piping, i.e. the second flexible portion of the outer envelope and the second flexible portion of the at least one inner duct are situated between two connections which slide between the outer envelope and the at least one inner duct;

the resilient area comprises a third resilient portion of the at least one inner duct;

the third resilient portion is situated between the mechanism of universal joints and a rigid connection between the outer envelope and the at least one inner duct on the second structure side;

the two universal joints are arranged in series along the piping according to the longitudinal direction;

at least one of the flexible units comprises bellows covered with a braid which prevents variation of the length of the bellows according to the longitudinal direction;

the piping has a generally straight form in the absence of a differential of stresses or in the absence of relative displacements between its ends, and otherwise the system for compensation for displacements permits limited localized deformation in the form of an S of the duct.

The invention also relates to an installation comprising two separate structures connected by a device for transfer of fluid according to any one of the characteristics indicated previously or hereinafter, wherein the first structure comprises one out of: a building, a source of cryogenic fluid, a bridge, whereas the second structure comprises one out of: a building, an enclosure which accommodates an apparatus for generation of plasma of the "Tokamak" type.

The invention can also relate to any alternative device or method comprising any combination of the characteristics indicated previously or hereinafter.

BRIEF DESCRIPTION OF THE FIGURES

Other particular features and advantages will become apparent from reading the following description, provided with reference to the figures, in which:

FIG. 1 represents a side view in schematic and partial cross section, illustrating a possible embodiment of the invention;

FIG. 2 represents a view in longitudinal half section illustrating an example of the structure of bellows which can be used in the device according to the invention;

FIG. 4 represents a schematic view from above, partially in transparence, illustrating the piping of the device in FIGS. 1 and 3;

FIG. 5 represents a schematic side view in longitudinal cross section illustrating the piping in FIG. 4;

DETAILED DESCRIPTION OF THE INVENTION

Figure 3:
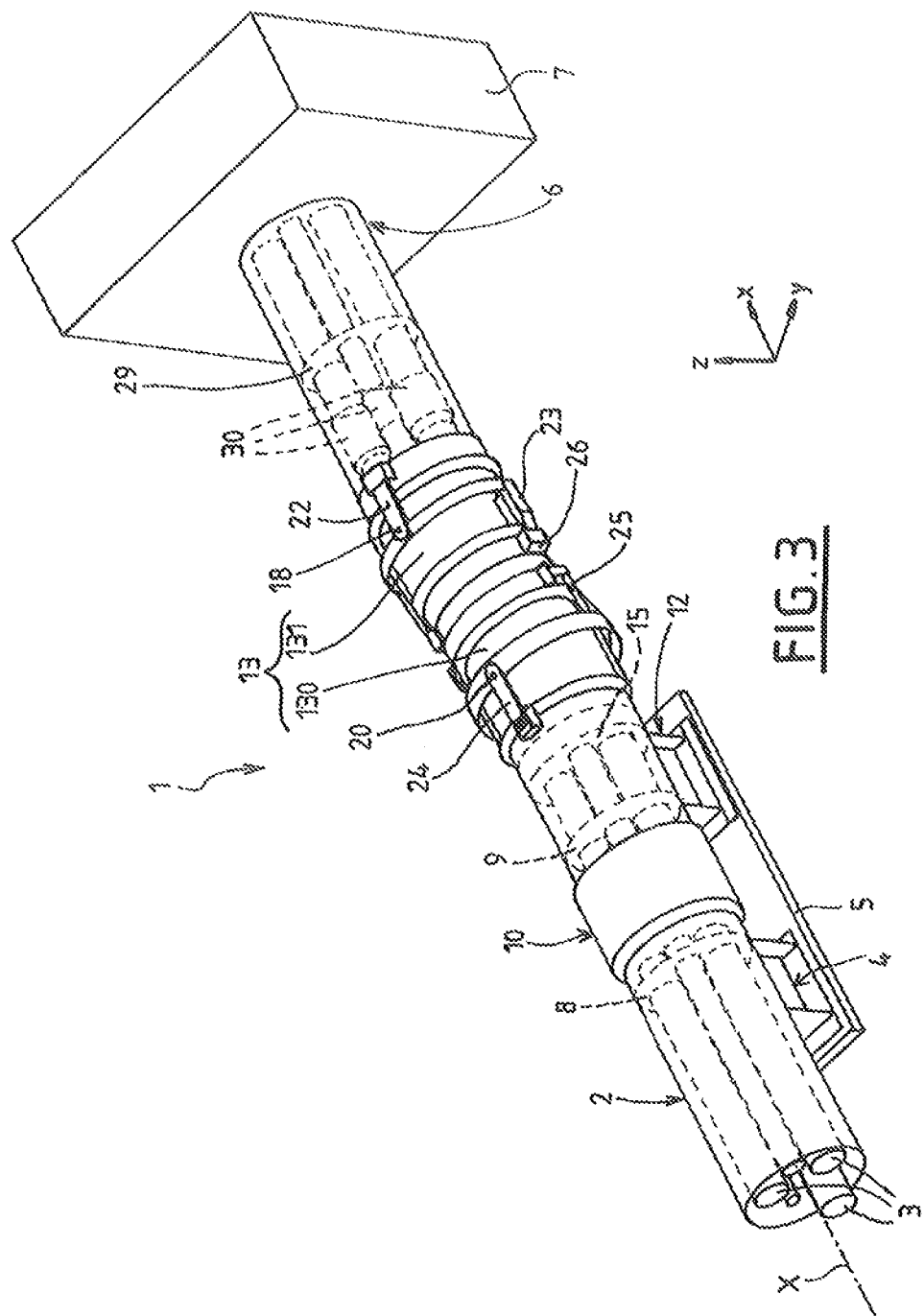
FIG. 3 represents a view in perspective, partially in transparence, illustrating schematically and partially an installation provided with a transfer device according to the invention.

FIG. 1 illustrates schematically and partially an embodiment of a device for transfer of fluid between two ends connected respectively to two separate structures 5, 7. Each structure 5, 7 can be a building, a bridge or any other physical structure. The transfer device 1 is designed to ensure transfer of fluid, for example cryogenic fluid, between the two structures 5, 7, whilst resisting relative displacements of the two structures 5, 7 (in the case of an earthquake or wind for example) or as a result of expansion/retractions within the device.

The device 1 comprises straight rigid piping formed substantially by metal tubes. This piping is of the double-envelope type, and extends according to a longitudinal axis x.

The piping comprises an outer envelope 2, for example made of metal or stainless steel, which, in its inner volume designed to be put under vacuum, accommodates at least one inner duct 3 for transfer of fluid (i.e. at least one inner duct made of metal or stainless steel which is designed to convey fluid).

For the sake of simplification, only one inner duct 3 is represented schematically by a continuous line in FIG. 1. It will be appreciated that, and as illustrated in greater detail in FIGS. 3 to 5, a plurality of parallel independent inner ducts 3 can be accommodated in the outer envelope 2 (elements which are identical are designated by the same numbers in different figures).

At a first end, the piping comprises a first rigid connection 4 of the outer envelope 2 to the first structure 5, and, at a second end, a second rigid connection 6 of the outer envelope 2 to the second structure 7.

The first and second ends of the outer envelope 2 are connected rigidly to the at least one inner duct 3.

Conventionally, the piping comprises a system for compensation for relative displacements between its first 4 and second 6 ends, and also for compensation for the differential expansions between the component parts.

This system for compensation for displacements comprises at least one flexible area and at least one resilient area (which are distinct or combined). The resilient area 10, 11, 30 provides at least part of the piping with resilience according to the longitudinal direction x.

In addition, the device comprises a connection 12 which slides according to the longitudinal axis x between the outer envelope 2 and the first structure 5. The device additionally comprises a mechanism 17 containing two universal joints, and connecting the two ends of the flexible area 13, 14. As described in greater detail hereinafter, the universal joints preferably each have two distinct axes of articulation 18, 20, 19, 21 perpendicular to the longitudinal axis x.

The resilient area comprises a first resilient portion 10 of the outer envelope 2, and a first resilient portion 11 of the at least one inner duct 3.

Preferably, and as illustrated in FIGS. 1 and 5, the first resilient portion 10 of the outer envelope 2 is concentric to the first resilient portion 11 of the inner duct(s) 3. In addition, said resilient portion 11 of the at least one inner duct 3 is preferably situated between two rigid connections 8, 9 formed between the outer envelope 2 and the at least one inner duct 3. As can be seen in FIGS. 3 and 5, the rigid connections 8, 9 formed between the outer envelope 2 and the at least one inner duct 3 can each comprise a spacing disk which is arranged transversely to the inside of the outer envelope 2, and is provided with an orifice for the passage and retention of the inner ducts 3. The connections between the outer envelope 2 and the inner ducts 3 can be provided via these spacing disks 8, 9.

As illustrated schematically in FIG. 1, each resilient portion 10, 11 can be formed by bellows.

The first resilient portion 11 of the at least one inner duct 3 permits axial displacement of the inner ducts 3 by contraction or extension of the bellows. Similarly, the first resilient portion 10 of the outer envelope 2 permits axial displacement of the outer envelope 2 by contraction or extension of the bellows.

FIG. 2 illustrates by way of example the arrangement of bellows 11 of an inner duct 3, comprising a metal wave, the two ends of which are connected respectively to two rings 111 welded on portions of duct 3. Conventionally, and as illustrated, a cylindrical sleeve 110 can be placed in the interior, opposite the waves, in order to limit the disturbances within the fluid which flows in the duct 3.

The flexible area 13, 14 for its part comprises a second flexible and resilient portion 13 of the outer envelope 2, and a second flexible portion 14 of the at least one inner duct 3. The mechanism 17 of universal joints mechanically connects the two ends of the outer envelope 2 situated respectively on both sides of the second flexible portion 13 of the outer envelope 2.

The second flexible and resilient portion 13 of the outer envelope 2 can comprise one and preferably two bellows 130, 131 as described hereinafter.

The second flexible and resilient portion 13 of the outer envelope 2 permits displacement according to the directions y and z perpendicular to the longitudinal axis x (y=transverse direction on the horizontal plane, z=vertical direction) via a localized rotation (ball joint) of the piping. Although variation of the length of the bellows according to the longitudinal direction x is theoretically possible, in practice it is not possible because the mechanism 17 of universal joints is conventionally formed in order to prevent expansion according to the longitudinal direction of the flexible and resilient portion 13 of the outer envelope 2.

Similarly, the second flexible portion 14 of the inner duct 13 permits displacement according to the transverse directions y and z.

The mechanism 17 of universal joints which permits rotation of the piping around the direction y and the direction z ensures the stability and absorption of forces of this part.

In fact, the mechanism 17 of universal joints absorbs the so-called "end of bellows" forces, i.e. the compression forces exerted by the external pressure (atmosphere) on the waves of the bellows 130, 131 as a result of the zero internal pressure (isolation vacuum in the outer envelope 2).

The second flexible portion 14 of the duct(s) 3 comprises at least one flexible unit.

As illustrated schematically in FIG. 1, each flexible unit 14 can comprise for example bellows covered with a braid 31, thus preventing variation of the length of the bellows. In other words the flexible unit permits torsion movement of the piping, but not elongation or longitudinal retraction.

The second flexible portion 14 of the inner duct(s) 3 is situated between two connections 15, 16 which slide between the outer envelope 2 and the inner ducts 3 (cf. FIGS. 1 and 5 for example via spacing disks as previously described, but permitting guiding of the relative displacement of the inner ducts 3 in relation to the outer envelope 2).

Figure 6:
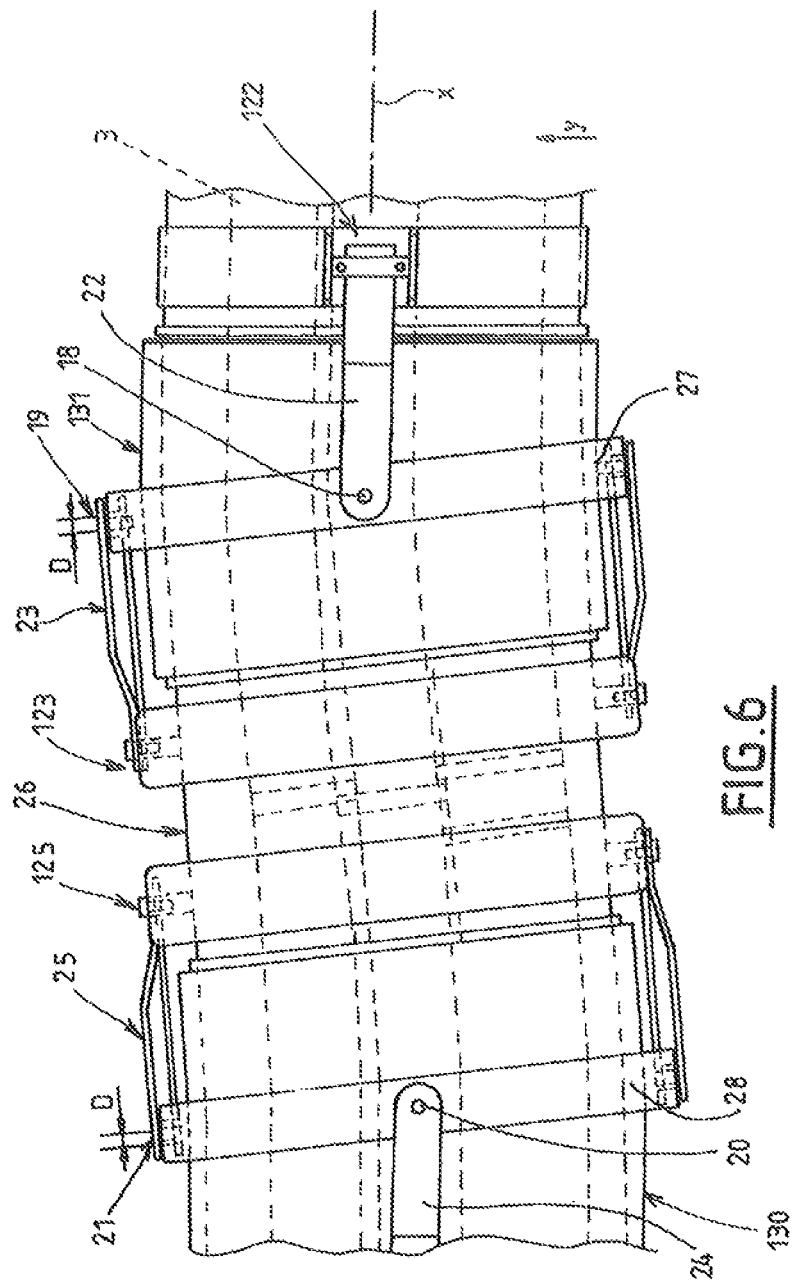
FIG. 6 represents an enlarged view of a detail of FIG. 4, illustrating an example of a mechanism of universal joints of the device.

As can be seen in FIGS. 3, 5 and 6 in particular, the second flexible and resilient portion 13 of the outer envelope 2 can comprise two bellows 130, 131 which are connected in series (welding or the like) on both sides of a rigid tubular portion 26. Similarly, and as can be seen in FIG. 5, the second flexible portion 14 of each inner duct 3 can comprise two flexible units 140, 141 connected in series (welding or the like) on both sides of a rigid tubular portion 126.

The constitution of the bellows/flexible units in a plurality of sections 130, 131, 140, 141 in series makes it possible to arrange inner spacing disks between two adjacent bellows/flexible units in order to maintain the spacing between ducts 3, and make it possible to thermalize the inner ducts 3 (i.e. put them into thermal connection) if necessary.

As illustrated in FIGS. 3 to 5, and in particular in FIG. 6, a first universal joint connects the central rigid portion 26 of the outer envelope 2 to a first side of the outer envelope 2 (towards the first structure 5), whereas a second universal joint connects the central rigid portion 26 of the outer envelope 2 to a second side of the outer envelope 2 (towards the second structure 7).

Each universal joint thus has two distinct axes of articulation (respectively 18, 19 and 20, 21) perpendicular to the longitudinal axis x. In addition, the two axes of articulation 18, 19 of a universal joint are parallel respectively to the two axes of articulation 20, 21 of the other universal joint 24, 25.

Two first parallel axes of articulation 18, 20 of the universal joints are situated on a vertical plane, in order to permit limited horizontal deflection (direction y) of the piping. The two parallel axes of articulation 19, 21 are for their part situated on a horizontal plane, in order to permit limited vertical deflection (direction z) of the piping.

More specifically, each universal joint can comprise a first pair of respective connection arms 23, 25 with a first end 123, 125 connected rigidly (welding or the like) to the central rigid portion 26, and a second end articulated on a first respective connection ring 27, 28 arranged around respective bellows 130, 131. In addition, each universal joint can comprise a second pair of respective connection arms 22, 24 with a first end 18, 20 articulated on the first respective connection ring 27, 28, and a second end 122 connected rigidly (welding or the like) to a side concerned of the outer envelope 2.

In other words, the two universal joints are connected to the central rigid portion 26 symmetrically relative to the central part of the latter.

The two arms of each first pair of arms 23, 25 are for example situated according to the longitudinal axis x, and arranged in a diametrically opposite manner around the outer envelope 2.

Similarly, the two arms of each second pair of arms 22, 24 are for example situated according to the longitudinal axis x, and arranged in a diametrically opposite manner around the outer envelope 2.

In order to further improve the stability of the mechanism of universal joints, according to the longitudinal direction x the two first axes of articulations 18, 20 are preferably situated between the two second axes of articulations 19, 21. In other words, longitudinally, the two first axes of horizontal rotation 18, 20 (parallel to the direction z) are situated between the two second axes of vertical rotation 19, 21 (parallel to the direction y). FIG. 6 represents the longitudinal spacings D between the axes of a single universal joint. This spacing is preferably between 20 mm and 50 mm. This configuration creates a resulting force on the mechanism of universal joints which tends to keep the mechanism of universal joints stable in the straight position. This offsetting creates positive forces favorable to the stability of the system in a straight stable position. In other words, by this means, in the lack of a given stress, the piping tends to remain straight, and not to adopt deformation in the form of an S under its own weight.

As can be seen in FIG. 1 in particular, the resilient area can comprise a third resilient portion 30 of the at least one inner duct 3. The third resilient portion 30 is situated for example between the mechanism 17 of universal joints and a rigid connection 29 between the outer envelope 2 and the at least one inner duct 3 (at the second end 7).

This third resilient portion 30 makes it possible to compensate for the differences of length of the inner ducts 3 during displacement in the transverse directions y or z. In addition, this third resilient portion 30 makes it possible to compensate for the variations of length caused by changes of temperature (for example: contraction of the inner ducts 3 during cooling between two fixed points 29, 9).

As illustrated in FIGS. 3 to 5 in particular, the third resilient portion 30 comprises for example bellows on the inner duct(s) 3.

Preferably, a difference of cross section is provided between firstly the flexible units 140, 141 of the second flexible portion, and secondly the bellows 30, in order to maintain tension in the waves of the bellows so as to withstand the internal pressure.

In the absence of stresses, the piping has a generally straight form. On the other hand, in the case of relative displacements between its ends, and/or in the case of differential expansions of the ducts 3 and envelopes 2, the above-described structure permits limited localized deformation of the outer envelope 2 and of the inner ducts 3 (for example in the form of an S vertically or laterally), in order to compensate for these differences without damaging the piping.

The transfer device according to the invention thus makes it possible to provide straight piping with a system which permits absorption of expansions, forces of the wind, and displacements caused by earthquakes.

The device according to the invention thus makes it possible to avoid bent piping of the "crank" type, which, as well as generating additional load losses, is very voluminous.

In the embodiment, the first resilient portion 10, 11 is distinct from the first flexible portion (separated longitudinally). It will be appreciated that, as a variant, the resilient portion can be situated at the mechanism of universal joints. For example, the bellows 13, 14 can be replaced by flexible units which are resilient longitudinally, and the universal joints can incorporate a portion which is resilient longitudinally (for example at the arms 22, 23, 24, 25). In other words, the flexible and resilient portions can be combined in a single portion.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A device for transfer of fluid between two ends which are designed to be connected respectively to two separate structures, the device comprising rigid double-envelope piping which extends according to a longitudinal axis, the piping comprising an outer envelope which accommodates in its inner volume which is designed to be put under vacuum at least one inner duct for transfer of fluid, the piping comprising at a first end a first rigid connection of the outer envelope to the first structure, and, at a second end, a second rigid connection of the outer envelope to the second structure, the first and second ends of the outer envelope being connected rigidly to the at least one inner duct, the piping comprising a system for compensation for relative displacements between its first and second ends, comprising at least one flexible area and at least one resilient area, said at least one resilient area being resilient according to the longitudinal direction, the system for compensation for displacements additionally comprising a connection which slides according to the longitudinal axis, between the outer envelope and the first structure, and a mechanism of universal joints, containing two universal joints and mechanically connecting the two ends of the flexible area.

2. The device of claim 1, wherein the two universal joints each have two distinct axes of articulation perpendicular to the longitudinal axis.

3. The device of claim 2, wherein one of the two universal joints has two axes of articulations which are parallel respectively to the two axes of articulations of the other universal joint.

4. The device of claim 2, wherein, when the device is in the fitted position, two first axes of parallel articulations of the universal joints are situated on a vertical plane, in order to permit limited horizontal deflection (direction y) of the piping, whereas the two other, second axes of parallel articulations are situated on a horizontal plane, in order to permit limited horizontal deflection (direction z) of the flexible area of the piping.

5. The device of claim 4, wherein, in the longitudinal direction, the two first axes of articulations are situated between the two second axes of articulations.

6. The device of claim 1, wherein the resilient area comprises a first resilient portion of the outer envelope, and a first resilient portion of the at least one inner duct, said resilient portion of the at least one inner duct being situated between two rigid connections between the outer envelope and the at least one inner duct.

7. The device of claim 6, wherein the first resilient portion of the outer envelope and the first resilient portion of the at least one inner duct each comprise resilient bellows.

8. The device of claim 1, wherein the flexible area comprises a second flexible and resilient portion of the outer envelope, and a second flexible portion of the at least one inner duct, and in that the mechanism of universal joints connects the two ends of the outer envelope which are situated respectively on both sides of the second flexible and resilient portion of the outer envelope.

9. The device of claim 8, wherein the second flexible and resilient portion of the outer envelope comprises two bellows which are connected in series on both sides of a central rigid portion.

10. The device of claim 9, wherein a first universal joint connects the central rigid portion of the outer envelope to a first side of the outer envelope which is oriented towards the first structure, whereas a second universal joint connects the central rigid portion of the outer envelope to a second side of the outer envelope which is oriented towards the second structure.

11. The device of claim 10, wherein each universal joint comprises a first pair of respective connection arms with a first end which is connected rigidly to the central rigid portion, and a second end which is articulated on a first respective connection ring arranged around a respective flexible unit, each universal joint comprising a second pair of respective connection arms with a first end which is articulated on the first respective connection ring, and a second end which is connected rigidly to a side of the outer envelope.

12. The device of claim 8, wherein the second flexible portion of the at least one inner duct comprises two flexible units connected in series on both sides of a central rigid portion.

13. The device of claim 8, wherein, on both sides of the second flexible portion of the at least one inner duct, the at least one inner duct is connected to the outer envelope via respective connections which slide according to a direction parallel to the longitudinal axis of the piping, i.e. the second flexible portion of the outer envelope and the second flexible portion of the at least one inner duct are situated between two connections which slide between the outer envelope and the at least one inner duct.

14. The device of claim 1, wherein the resilient area comprises a third resilient portion of the at least one inner duct.

15. The device of claim 1, wherein said two different structures are two different buildings.

16. An installation comprising two separate structures connected by a device for transfer of fluid according to claim 1, wherein a first structure comprises one out of: a building, a source of cryogenic fluid, a bridge, whereas the second structure comprises one out of: a building, an enclosure which accommodates an apparatus for generation of plasma of the "Tokamak" type.

* * * * *